United States Patent [19]

Chambers

[11] Patent Number: 5,000,897
[45] Date of Patent: Mar. 19, 1991

[54] POLYPHENYLENE ETHER-POLYAMIDE COMPOSITIONS AND METHODS FOR PREPARATION

[75] Inventor: Gregory R. Chambers, Delmar, N.Y.

[73] Assignee: General Electric Company, Selkirk, N.Y.

[21] Appl. No.: 262,520

[22] Filed: Oct. 25, 1988

Related U.S. Application Data

[63] Continuation of Ser. No. 841,974, Mar. 20, 1986, abandoned.

[51] Int. Cl.$^5$ .................... C08L 71/04; C08L 77/06
[52] U.S. Cl. ........................ 264/141; 525/92; 525/391; 525/392; 525/397; 525/905
[58] Field of Search ............... 525/391, 397, 92, 392, 525/905; 204/141

[56] References Cited

U.S. PATENT DOCUMENTS

| | | | |
|---|---|---|---|
| 4,315,086 | 2/1982 | Ueno et al. | 525/391 |
| 4,339,376 | 7/1982 | Kasahara et al. | 524/116 |
| 4,448,934 | 5/1984 | Weaver | 525/184 |
| 4,600,741 | 7/1986 | Aycock et al. | 524/139 |

FOREIGN PATENT DOCUMENTS

| | | |
|---|---|---|
| 59-66452 | 4/1984 | Japan. |
| WO85/05372 | 12/1985 | World Int. Prop. O. |

*Primary Examiner*—Ana L. Carrillo
*Attorney, Agent, or Firm*—Hedman, Gibson, Costigan & Hoare

[57] ABSTRACT

Polyphenylene ether-polyamide compositions compatibilized with polyfunctional compounds such as aliphatic polycarboxylic acids can achieve improved impact strength and ductility by producing an intermediate polyphenylene ether-polyamide product containing at least some nylon 6,6 and thereafter further compounding the intermediate product with a second polyamide component containing at least some of a polyamide different from nylon 6,6.

23 Claims, No Drawings

POLYPHENYLENE ETHER-POLYAMIDE COMPOSITIONS AND METHODS FOR PREPARATION

This is a continuation of application Ser. No. 841,974, filed Mar. 20, 1986, now abandoned.

FIELD OF THE INVENTION

For compatibilized polyphenylene ether-polyamide compositions which utilize certain polyfunctional compatibilizing compounds such as aliphatic polycarboxylic acids, it is possible to obtain improved impact strength and ductility by manufacturing an intermediate polyphenylene ether-polyamide compound utilizing a first polyamide component containing at least some nylon 6,6. The intermediate product is further compounded with a second polyamide component containing one or more polyamide resins different from nylon 6,6 or blends of such polyamide resins with nylon 6,6, to provide a compatibilized polyphenylene ether-polyamide composition having superior properties.

BACKGROUND OF THE INVENTION

Compatibilized polyphenylene ether-polyamide compositions have been provided utilizing a variety of base resins and compatibilizing systems. These thermoplastic products offer a wide range of beneficial properties which take advantage of the strengths of the basic resins while improving upon the weaknesses of each. Among the most useful properties of compatibilized polyphenylene ether-polyamide compositions are excellent heat resistance, chemical resistance, impact strength, hydrolytic stability and dimensional stability. Such compatibilized polyphenylene ether-polyamide compositions have found great utility in exterior automotive applications such as body panels. Examples of compatibilized polyphenylene ether-polyamide compositions can be found in U.S. Pat. application Ser. No. 736,490, filed May 20, 1985, now abandoned and U.S. Pat. No. 4,315,086, both of which are hereby incorporated by reference.

The improved properties of polyphenylene ether-polyamide compositions have been achieved by providing a compatible combination of these normally incompatible resins.

A particularly useful series of compatibilized polyphenylene ether-polyamide products are based upon the combination of a polyphenylene ether, a polyamide resin (especially nylon 6,6) and a polyfunctional compatibilizing agent such as the aliphatic polycarboxylic acids (e.g. citric acid). When chemical resistance is important, the polyamide components will comprise at least 35 weight percent of the total composition, based upon the weight of the polyphenylene ether, the polyamide and any rubber impact modifier which may be used. This weight proportion will typically enable the polyamide to form a continuous phase as will the use of compatibilizing amounts of the polyfunctional compatibilizing agent.

It is believed that polyfunctional compatibilizing agents can facilitate formation of a graft copolymer of the polyphenylene ether and polyamide components. Such a reaction has been readily shown to take place under the time, temperature and shear conditions of typical thermoplastic extrusion processes. Graft copolymer produced in this fashion may serve as a melt surfactant which stabilizes the morphology of the resinous components of the system. Compatibility may also be achieved by improved interfacial adhesion of the resinous components.

Although compatibilized PPE/polyamide compositions utilizing nylon 6,6 offer many advantageous properties, compositions containing other polyamides are also sought. Compositions containing a nylon 6 component should benefit from reduced raw material cost as well as improved ductility. Experience has shown, however, that preparation of PPE/polyamide compositions containing nylon 6 and utilizing a polycarboxylic compatibilizing agent such as citric acid has been more difficult than preparation of PPE/polyamide compositions containing nylon 6,6. Generally, more severe compounding conditions are required to achieve acceptable properties.

It has now been discovered that PPE/polyamide compositions compatibilized with an aliphatic polycarboxylic acid compound and which contain a plurality of polyamide components have better impact strength and ductility compared to control compositions containing only one nylon component when manufactured in accordance with the process described below.

DESCRIPTION OF THE INVENTION

Compatibilized polyphenylene ether-polyamide compositions exhibiting the aforementioned improved properties are provided in the following manner.

A first compounding step provides an intermediate PPE/polyamide product. The compounding step is achieved by means typically found in the art of manufacturing thermoplastic resins. Generally, the constituent components are blended together, often in a mechanical blender, to provide a generally uniform mixture of starting materials. This blend of ingredients is then fed to a compounding apparatus which applies sufficient temperature and shear conditions to produce a thermoplastic resin product. The thermoplastic resin product can be a mixture or reaction product of the components. Typically, the compounding apparatus will be an extruder of the single or twin screw type. Melt blending apparatus may also be suitable for the compounding step.

In the instant case, a polyphenylene ether resin is blended with a first polyamide component containing at least some nylon 6,6 resin together with a polyfunctional compatibilizing agent, an optional rubber impact modifier, and typical stabilizers if desired.

This mixture may be fed to the feedthroat of an extruder which begins compounding the ingredients to provide an intermediate PPE/polyamide product.

Subsequent to the aforementioned first compounding step, further compounding takes place in a second step. In a preferred embodiment, an extruder is fitted with a second addition port, downstream from the main feedthroat. In an extrusion process, this second step can operate on a continuous basis.

At this downstream addition port, the second polyamide component is added to the intermediate PPE/polyamide composition, and additional compounding takes place. It is evident that the polyamide charged in this second step will probably experience less degradation since it has less exposure to high temperature and shear conditions.

The compatibilized PPE/polyamide final product, which in this instance is the extrudate of the compounding process, can be dried and pelletized by conventional means to provide thermoplastic resin products.

An alternate, less preferred embodiment could accomplish the second compounding step by re-compounding the intermediate product of the first compounding step. For example, the original blend of ingredients (containing the first polyamide component) could be fully extruded to provide the intermediate polyphenylene ether-polyamide product. This intermediate product could be further blended with the second polyamide component and then re-compounded (such as by re-extrusion) to provide the final compatibilized polyphenylene ether-polyamide product.

The compatibilized polyphenylene ether-polyamide compositions produced herein are typically comprised of A. 10 to 55 parts by weight of a polyphenylene ether resin, preferably poly(2,6-dimethyl-1,4-phenylene ether);

B. 35 to 90 parts by weight of a plurality of polyamide resins comprised of (i) 5 to 75 weight percent nylon 6,6 and (ii) 25 to 95 weight percent of a second polyamide resin selected from the group consisting of nylon 6; nylon 6,9; nylon 10; nylon 11; nylon 12; nylon 4,6 and amorphous nylon. The process of the present invention is a multistep process wherein the polyamide resins are provided in two distinct components. The first polyamide component is utilized in the first compounding step and is always comprised of at least some nylon 6,6. This first polyamide component will typically comprise 10 to 50 weight percent of all the polyamide resins utilized in the compatibilized polyphenylene ether-polyamide compositions. Furthermore, referring solely to this first polyamide component, at least 20 weight percent of this component will be nylon 6,6. The remaining 0 to 80 weight percent of this first polyamide component can be one or more of these polyamides: nylon 6; nylon 6,9; nylon 10; nylon 11; nylon 12; nylon 4,6 and amorphous nylons; etc. Preferably, all or most of the first polyamide component will be comprised of nylon 6,6.

Accordingly, the second polyamide component will constitute approximately 50 to 90 weight percent of the polyamide resins in the total composition. Inasmuch as it is an object of the present invention to avoid using nylon 6,6 as the sole polyamide in the second compounding step, at least one other polyamide such as those enumerated above will be utilized. As will be seen in the examples, blends of these other polyamides with nylon 6,6 are acceptable. Nylon 6 is the preferred polyamide for use in the second compounding step.

C. a compatibilizing amount, typically 0.1 to 2.0 parts of a polyfunctional compatibilizer compound characterized as having both (a) a group represented by the formula (OR) wherein R is hydrogen, or an alkyl, aryl, acyl, or carbonyl dioxy group and (b) at least two groups each of which may be the same or different selected from carboxylic acid, acid halide, acid anhydride, anhydride, acid halide anhydride, acid ester, acid amide, imide, amide and amide and salts thereof. Preferred among these are the aliphatic polycarboxylic acids such as citric acid mono-hydrate and anhydrous citric acid. Less than about 0.1 parts compatibilizing agent will not be generally useful, whereas loadings above 2.0 parts offer little additional benefit;

D. optionally, 0 to 25 parts by weight of a rubbery impact modifier such as styrene-butadiene-styrene triblock copolymer, styrene-ethylene/butylene-styrene triblock copolymer, styrene-ethylene/butylene-styrene triblock copolymer, styrene-ethylene/propylene diblock copolymer, or core/shell rubber modifiers such as those having a crosslinked acrylate core and a crosslinked styrene or crosslinked styrene-acrylonitrile shell.

Polyphenylene ethers are a well known class of compounds sometimes referred to as polyphenylene oxides. Examples of suitable polyphenylene ethers and processes for preparation can be found in U.S. Pat. Nos. 3,3086,874; 3,306,875; 3,257,357; and 3,257,358 which are each incorporated by reference. Compositions of the present invention will encompass homopolymers, copolymers and graft copolymers obtained by the oxidative coupling of phenolic compounds. The preferred polyphenylene ethers used as base resins in compositions of the present invention will be comprised of units derived from 2,6-dimethyl phenol. Also contemplated are PPE copolymers comprised of units derived from 2,6-dimethyl phenol and 2,3,6-trimethyl phenol.

A particularly useful polyphenylene ether would be poly(2,6-dimethyl-1,4-phenylene ether) having an intrinsic viscosity (I.V.) greater than, approximately 0.10 dl/g as measured in chloroform at 25° C. The I.V. will typically be between 0.30 and 0.60 dl/g.

The polyamide resins useful in the practice of the present invention are known as nylons, and are characterized by the presence of an amide group (—CONH—). Nylon-6 and nylon-6,6 are the generally preferred polyamides and are available from a variety of commercial sources.

The polyamides can be provided by a number of well known processes. Nylon-6, for example, is a polymerization product of caprolactam. Nylon-6,6 is a condensation product of adipic acid and hexamethylenediamine. A nylon-6,6 having an average molecular weight of approximately 10,000 is especially preferred for use in the first compounding step of the present process. Preferred polyamides will typically have a relative viscosity of at least 35, in accordance with ASTM Test Method D789.

The polyfunctional compatibilizer compounds suitable for use herein are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, acid anhydride, anhydride, acid halide anhydride, acid ester, acid amide, imido, amino and salts thereof. Typical of this group of compatibilizers are the aliphatic polycarboxylic acids, acid esters and acid amides represented by the formula:

wherein R is a linear or branched chain, saturated aliphatic hydrocarbon of from 2 to 20, preferably 2 to 10, carbon atoms; $R^I$ is selected from the group consisting of hydrogen or an alyl, aryl, acyl or carbonyl dioxy group of 1 to 10, preferably 1 to 6, most preferably 1 to 4, carbon atoms, especially preferred is hydrogen; each $R^{II}$ is independently selected from the group consisting of hydrogen or an alkyl or aryl group of from 1 to 20 carbon atoms preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Illustrative of suitable polycarboxylic acids there may be given citric acid, malic acid, and agaricic acid; including the various commercial forms thereof, such as, for example, the anhydrous and hydrated acids. Of these, citric acid is one of the preferred compatibilizing agents. Illustrative of acid esters useful herein include for example, acetyl citrate and mono- and/or di- stearyl citrates and the like. Suitable acid amides useful herein include for example N,N'- diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Especially preferred derivatives are the salts thereof, including the salts with amines and/preferably, the alkali and alkaline metal salts. Exemplary of suitable salts include calcium malate, calcium citrate, potassium malate and potassium citrate.

Conventional additives such as pigments, thermal and color stabilizers, reinforcing and other fillers, flame retardants, metal synergists and processing aids may all be employed in the practice of the invention.

The following examples describe several non-limiting embodiments of the invention. All parts are by weight unless noted otherwise.

EXAMPLES 1 AND 2

Several blends were prepared, each of which contained 49 parts by weight poly(2,6-dimethyl-1,4-phenylene ether) which had an intrinsic viscosity of, approximately, 0.45 dl/g as measured in chloroform at 25° C., 0.70 part citric acid monohydrate compatibilizing agent, 10 parts rubber modifier (Kraton D 1102, Shell Chemical, styrene-butadiene-styrene triblock copolymer), 0.30 part Irganox 1076 hindered phenol stabilizer, 0.10 part KI stabilizer, and 10 parts of a specified nylon.

The foregoing blended components of the composition were fed to the feedthroat of a 30 mm Werner & Pfleiderer twin screw extruder which was fitted with a downstream addition port. The extruder was set at 550° F., and was fitted with a downstream addition port.

An additional 31 parts of a nylon component specified in the table were fed at the downstream addition port.

The resulting extruded strand was chopped into pellets, dried and molded into ASTM test parts in a Newbury 3 ounce injection molder having a 550° F. set temperature profile and a mold set temperature of 150° F. All test results described in Table 1 were performed in accordance with ASTM test specifications.

The polyamide component designated as nylon 6,6 was NP-10,000 from Nylon Polymers The nylon 6 was Nycoa 471 from Nylon Corp. of America. Example 1 used a 50:50 blend of both nylons at both the extruder feedthroat as well as the downstream addition port. Improvement can be readily seen in Example 1, and, Example 2 dramatically shows improvement in Notched Izod impact and ductility utilizing the process of the present invention where the nylon 6,6 component is fed at the extruder feedthroat and the nylon 6 component is fed downstream. Mode of failure, in the Dynatup impact test, is indicated by D for ductile failure, Sp for ductile failure with a single split running across but not breaking the plaque, and B refers to brittle failure with many pieces.

The ductile behavior exhibited by the plastic products of the present invention is an extremely important property for many useful thermoplastic applications, especially in the automotive industry.

TABLE 1

|  | A8 | B* | 1 | 2 |
|---|---|---|---|---|
| Blend Nylon (10 parts) | 6,6 | 6 | Blend$^{(a)}$ | 6,6 |
| Downstream Nylon (31 parts) | 6,6 | 6 | Blend$^{(a)}$ | 6 |
| Physical Properties |  |  |  |  |
| Izod Impact-Notched (ft.-lbs./in) | 3.7 | 2.4 | 6.4 | 9.0 |
| Tensile Elongation (in %) | 73 | 122 | 75 | 74 |
| Dynatup Impact (ft.-lbs./in) | 44.4 | 45.8 | 40.8 | 44.8 |
| Mode of Failure | D/Sp | Sp/B | D/Sp | Ductile |
| Heat Distortion Temp. @ 66 psi (°F.) | 382 | 357 | 356 | 358 |

*Comparative Examples
$^{(a)}$Nylon 6 and Nylon 6,6 in a 50:50 weight ratio

EXAMPLES 3 TO 5

A second series of blends were prepared in the same manner as described for Example 1. The rubber component was either styrene-butadiene-styrene (S-B-S) triblock copolymer (Shell Chemical, Kraton D-1102), or styrene-ethylene/propylene (S-EP) selectively hydrogenated diblock copolymer (Shell Chemical, Kraton G-1702). In Example 3, a mixture of 10 parts Nylon 6,6 and 31 parts Nylon 6 was prepared prior to extrusion. Ten parts of this mixture was used in the blend at the main feedthroat and 31 parts were added downstream. A different, less severe screw configuration in the 30 mm Werner & Pfleiderer extruder was utilized in this series, causing the extrudate to experience a lesser degree of shear.

The same general improvement trends are seen in the series of experiments, especially regarding notched Izod impact strength and ductility. The absolute values of the notched Izod impact are lower, perhaps due to the less severe screw design.

TABLE 2

|  | D* | E* | 3 | 4 | 5 |
|---|---|---|---|---|---|
| BLEND NYLON (10 parts) | 6,6 | 6 | BLEND$^{(a)}$ | 6,6 | 6,6 |
| DOWNSTREAM NYLON (31 parts) | 6,6 | 6 | BLEND$^{(a)}$ | 6 | 6 |
| RUBBER (10 parts) | S-B-S | S-B-S | S-B-S | S-B-S | S-EP |
| Physical Properties |  |  |  |  |  |
| Izod Impact-Notched (ft-lbs/in) | 3.2 | 2.5 | 3.6 | 3.9 | 7.0 |
| Dynatup Impact (ft-lbs/in) | 43.4 | 42.5 | 50.9 | 53.5 | 44.2 |
| Mode of Failure | Sp | Sp | D | D | D |
| HDT @ 66 psi (°F.) | 382 | 364 | 360 | 360 | 366 |

*Comparative Examples
$^{(a)}$Nylon 6 and Nylon 6,6 in a 31:10 weight ratio.

What is claimed is:

1. A method for producing a compatibilized polyphenylene ether-polyamide composition having improved impact strength and ductility comprising the steps of:

(a) compounding in a first step (i) a polyphenylene ether resin, (ii) a first polyamide component comprised of 20 to 100 weight percent nylon 6,6 resin and 0 to 80 weight percent of another polyamide resin; and (iii) a compatibilizing amount of a compatibilizer compound; thereby providing an intermediate polyphenylene ether-polyamide composition; and (b) compounding in a second step, into said intermediate polyphenylene ether-polyamide composition, a second polyamide component containing at least one polyamide resin selected from the group consisting of nylon 6; nylon 6,9; nylon 10; nylon 11; nylon 12; nylon 4,6 and amorphous nylon; or a blend of said second polyamide with nylon 6,6, thereby providing compatibilized polyphenylene ether-polyamide product comprised of a plurality of polyamide resins.

2. A method as in claim 1 wherein said polyphenylene ether resin is comprised primarily of units selected from the group consisting of 2,6-dimethyl phenol and 2,3,6-trimethyl phenol units, and has an intrinsic viscosity of, approximately 0.1 to 0.6 dl/g as measured in chloroform at 25° C.

3. A method as in claim 2 wherein said polyphenylene ether is poly(2,6-dimethyl-1,4-phenylene ether).

4. A method as in claim 1 wherein said compatibilizer is a compound having both (a) a group represented by the formula (OR) wherein R is hydrogen or an alkyl, aryl, acyl or carbonyl dioxy group and (b) at least two groups which may be independently selected from the group consisting of carboxylic acid, acid halide, anhydride, acid ester, acid amide, imido, amino and salts thereof.

5. A method as in claim 4, wherein said compatibilizer is selected from the group consisting of polycarboxylic acids, acid esters and acid amides represented by the formula $$(R^{I}O)_m R(COOR^{II})_n (CONR^{III}R^{IV})_s$$

wherein R is a linear or branched chain, saturated aliphatic hydrocarbon of from 2 to 20 carbon atoms; $R^I$ is selected from the group consisting of hydrogen or an alkyl, aryl, acyl or carbonyl dioxy group of 1 to 10 carbon atoms; $R^{II}$ is selected from the group consisting of hydrogen or an alkyl or aryl group of from 1 to 20 carbon atoms; $R^{III}$ and $R^{IV}$ are independently selected from the group consisting of hydrogen or an alkyl or aryl group of from 1 to 10 carbon atoms; m is equal to 1; (n+s) is greater than or equal to 2 and n and s are each greater than or equal to zero; and ($OR^I$) is alpha or beta to a carbonyl group and at least two carbonyl groups are separated by 2 to 6 carbon atoms.

6. A method as in claim 5, wherein the compatibilizing compound is a polycarboxylic acid selected from the group consisting of anhydrous citric acid, anhydrous maleic acid, anhydrous agaricic acid, hydrated citric acid, hydrated maleic acid, hydrated agaricic acid, salts of any of the foregoing and mixtures of more than one of the foregoing.

7. A method as in claim 6, wherein the polycarboxylic acid salts are selected from the group consisting of calcium malate, calcium citrate, potassium malate, potassium citrate and mixtures of more than one of the foregoing.

8. A method as claimed in claim 4, wherein the compatibilizing compound is an acid ester selected from the group consisting of acetyl citrate, monostearyl citrate, distearyl citrate and mixtures of more than one of the foregoing.

9. A method as claimed in claim 4, wherein the compatibilizing compound is an acid amide selected from the group consisting of N,N'-diethyl citric acid amide, N,N'-dipropyl citric acid amide, N-phenyl citric acid amide, N-dodecyl citric acid amide, N,N'-didodecyl citric acid amide, N-dodecyl maleic acid amide, and mixtures of more than one of the foregoing.

10. A method as in claim 4 wherein said compatibilizing compound is citric acid.

11. A method as in claim 10 wherein said compatibilizing compound is 0.2 to 2.0 parts citric acid based on the weight of the compatibilized polyphenylene ether-polyamide product.

12. A method as in claim 1 wherein said polyphenylene ether-polyamide resin is further comprised of up to, approximately 25 parts by weight of an impact modifier, based upon the weight of the polyphenylene ether and polyamide components taken together.

13. A method as in claim 12 wherein said rubbery impact modifier is selected from the group consisting of styrene-butadiene-styrene triblock copolymer, styrene-ethylene-butylene-styrene triblock copolymer, styrene-ethylene propylene diblock copolymer, and a core/shell modifier having a crosslinked butylacrylate core and crosslinked styrenic shell.

14. A method as in claim 7 wherein said first and second polyamide components, taken together, comprise at least 35 percent by weight of the compatibilized polyphenylene ether-polyamide product based upon the total weight of the polyphenylene ether resin, the first and second polyamide components and impact modifier.

15. A method as in claim 1 wherein said first compounding step is accomplished at a feed throat of a thermoplastic extruder.

16. A method as in claim 10 wherein said second compounding step is accomplished by feeding said second polyamide component to said extruder at an addition port downstream from said feedthroat.

17. A method as in claim 1 comprising the further steps of drying and pelletizing a thermoplastic extrudate of the foregoing steps.

18. A method for producing a compatibilized polyphenylene ether-polyamide composition comprising 10 to 55 parts by weight polyphenylene ether resin and 35 to 90 parts of a plurality of polyamide resins, based on the weight of all such resins taken together and having improved impact strength and ductility, comprising the steps of:

(a) compounding in a first step
  (i) polyphenylene ether resin;
  (ii) a first polyamide component comprising 10 to 50 weight percent of all polyamide resin utilized in the composition, said first polyamide component being comprised of 20 to 100 weight percent nylon 6,6 and 0 to 80 weight percent nylon 6; and
  (iii) 0.2 to 2.0 parts by weight polycarboxylic acid, thereby providing an intermediate product; and
(b) compounding in a second step, into said intermediate product, 50 to 90 weight percent of all polyamide resin utilized, of nylon 6, or a blend of nylon 6 and nylon 6,6.

19. A process as in claim 18 wherein said polycarboxylic acid is citric acid monohydrate.

20. A method for producing a compatibilized polyphenylene ether-polyamide composition having improved impact strength and ductility comprising the steps of:
- (a) compounding in a first step (i) polyphenylene ether resin, (ii) a first polyamide component comprised of nylon 6,6 resin; and (iii) a compatibilizing amount of a compatibilizer compound; thereby providing an intermediate polyphenylene ether-polyamide composition; and
- (b) compounding in a second step, into said intermediate polyphenylene ether-polyamide composition, a second polyamide component comprised of a polyamide resin other than nylon 6,6 resin thereby providing compatibilized polyphenylene ether-polyamide product comprised of a plurality of polyamide resins.

21. A method for producing a compatibilized polyphenylene ether-polyamide composition having improved impact strength and ductility comprising the steps of:
- (a) compounding in a first step (i) 10 to 55 parts by weight of polyphenylene ether resin, (ii) a first polyamide component comprising 10 to 50 weight percent of all the polyamide resins utilized in the composition and comprised of 20 to 100 weight percent nylon 6,6 resin and 0 to 80 weight percent of a polyamide resin selected from the group consisting of nylon 6, nylon 6,9, nylon 10, nylon 11, nylon 12, nylon 4,6 and amorphous nylon; and (iii) 0.2 to 2.0 parts by weight of a compatibilizer compound characterized as having both (1.) a monovalent group represented by the formula (OR) wherein R is hydrogen, or an alkyl, aryl, acyl, or carbonyl dioxy group and (2.) at least two groups which may be the same or different selected from the group consisting of carboxylic acid, acid halide, acid anhydride, acid ester, acid amide, imide, amine and amine salts thereof; thereby providing an intermediate polyphenylene ether-polyamide composition; and
- (b) compounding in a second step, into said intermediate polyphenylene ether-polyamide composition, a second polyamide component comprising 50 to 90 weight percent of all the polyamide resins utilized in the composition and containing at least one polyamide resin selected from the group consisting of nylon 6; nylon 6,9; nylon 10; nylon 11; nylon 12; nylon 4,6 and amorphous nylon; or a blend of said second polyamide with nylon 6,6, thereby providing a compatibilized polyphenylene ether-polyamide product comprised of 35 to 90 parts by weight of a plurality of polyamide resins.

22. A method according to claim 19 wherein said first polyamide component is present in an amount of at least about 1 percent by weight based upon 100 percent by weight of all polymeric components.

23. In a method for producing a compatibilized polyphenylene ether-polyamide composition comprised of polyphenylene ether, polyamide and compatibilizer for the polyphenylene ether and polyamide, the improvement comprising the steps of:
- (a) adding polyamide to the composition in two compounding steps, the first step comprised of compounding a polyamide component comprised of nylon 6,6 resin with a combination of polyphenylene ether and compatibilizer to provide a polyphenylene ether-polyamide composition; and in the second step compounding into said polyphenylene ether-polyamide composition a second polyamide component comprised of at least one polyamide resin other than a nylon 6,6 resin, to thereby provide a compatibilized polyphenylene ether-polyamide composition comprised of a plurality of polyamide resins.

* * * * *

UNITED STATES PATENT AND TRADEMARK OFFICE
CERTIFICATE OF CORRECTION

PATENT NO. : 5,000,897
DATED : March 19, 1991
INVENTOR(S) : Gregory R. Chambers

It is certified that error appears in the above-identified patent and that said Letters Patent is hereby corrected as shown below:

Column 7;
In Claim 7, line 4, "or" should read as --of--; and
Column 8;
In Claim 13, line 1, "rubbery" should be deleted.

Signed and Sealed this

Fifteenth Day of September, 1992

*Attest:*

DOUGLAS B. COMER

*Attesting Officer*      *Acting Commissioner of Patents and Trademarks*